United States Patent [19]

Pederson et al.

[11] Patent Number: 4,794,315

[45] Date of Patent: Dec. 27, 1988

[54] RECHARGEABLE BATTERY-POWERED DEVICE

[75] Inventors: John T. Pederson, Kankakee; Jeffrey D. Wallace, Carol Stream, both of Ill.

[73] Assignee: Pittway Corporation, Northbrook, Ill.

[21] Appl. No.: 141,990

[22] Filed: Jan. 11, 1988

[51] Int. Cl.[4] .................... H02J 7/00; H01M 10/46
[52] U.S. Cl. ...................... 320/2; 362/183; 200/61.58 R
[58] Field of Search .......................... 320/2; 362/183; 200/61.58 R

[56] References Cited

U.S. PATENT DOCUMENTS 3,458,794  7/1969  Bohnstedt et al. ............... 320/2
4,647,832  3/1987  Fenne et al. ..................... 320/2
4,743,829  5/1988  Fenne et al. ..................... 320/2

Primary Examiner—R. J. Hickey
Attorney, Agent, or Firm—Dressler, Goldsmith, Shore, Sutker & Milnamow, Ltd.

[57] ABSTRACT

A self-contained rechargeable device, such as a flashlight, utilizing a rechargeable source of electrical energy, such as rechargeable batteries, and including a pivotally mounted connector for connecting the battery and any recharging circuit connected thereto to a source of recharging energy when positioned in a recharging position and, alternatively, having a standby position internally of the device in which the connector enables a circuit between the source of energy and a load to be operated thereby. The circuit is completed by operation of a manually-operated switch connected between the energy source and the load. The load is totally disconnected from the battery during recharging. A manually-operated actuator effects movement of the connector generally between the charging position, wherein the connector completes a circuit between the rechargeable batteries and a potential source of electrical recharging energy in the standby position where the connector enables the circuit between the batteries and the load and an position wherein the actuator operates the manual switch for energizing the load.

20 Claims, 3 Drawing Sheets

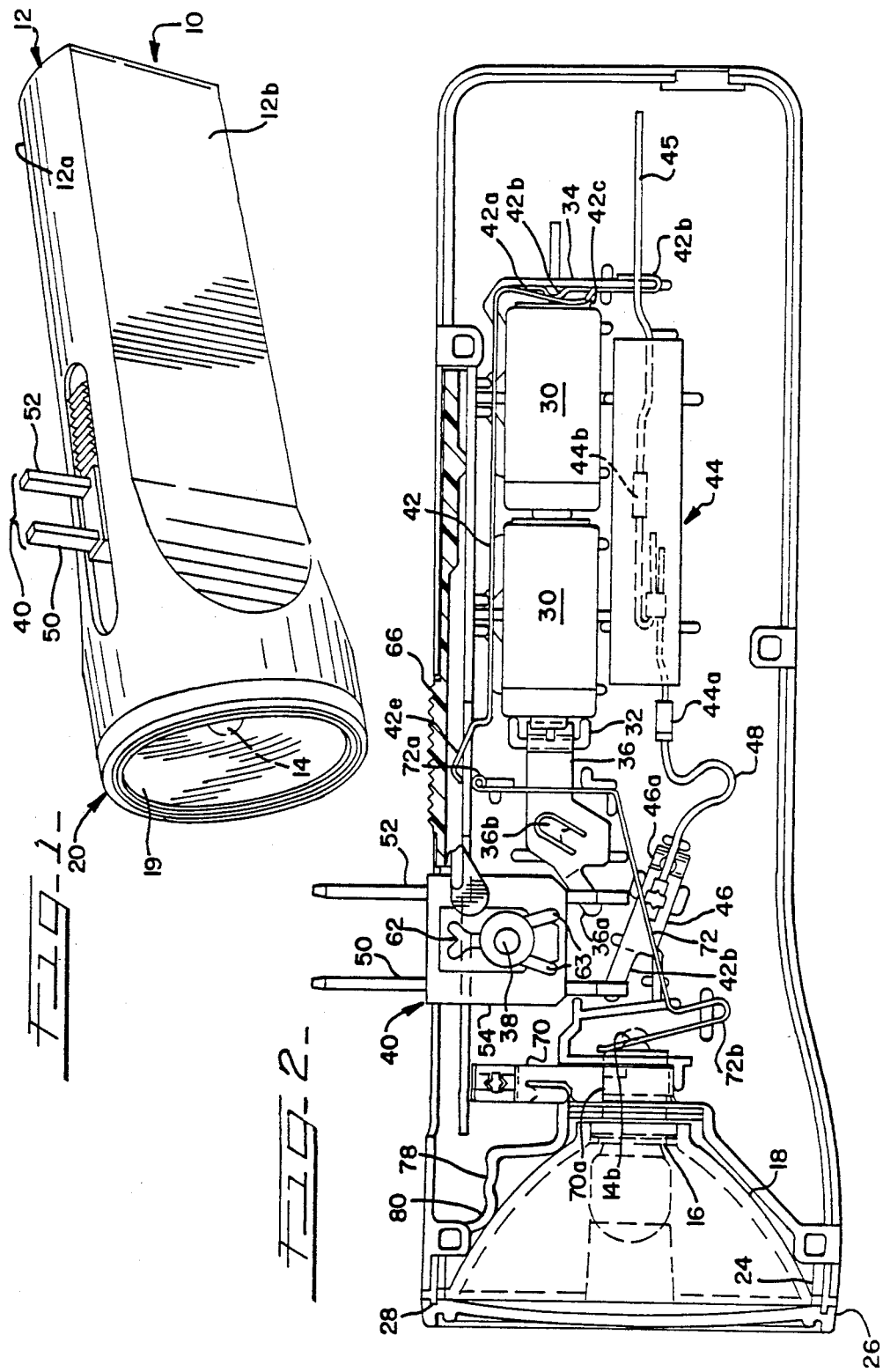

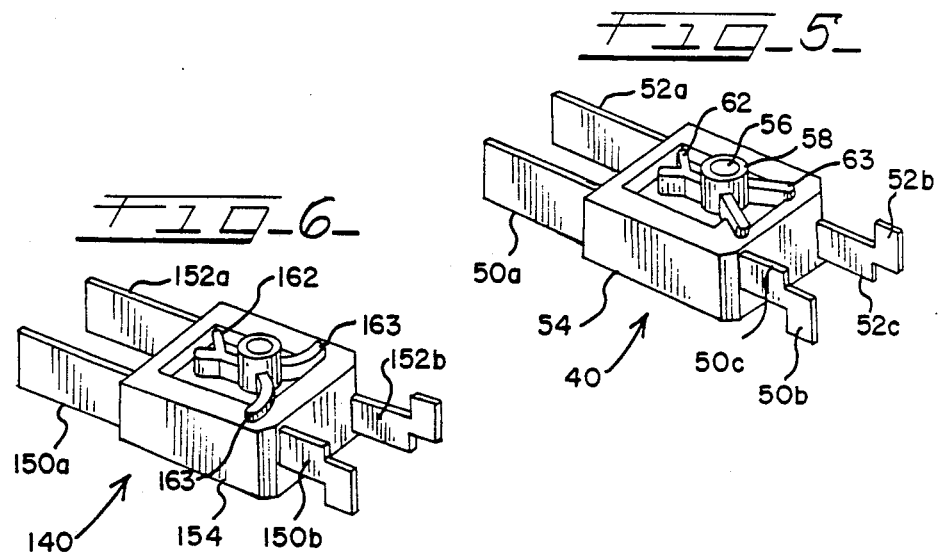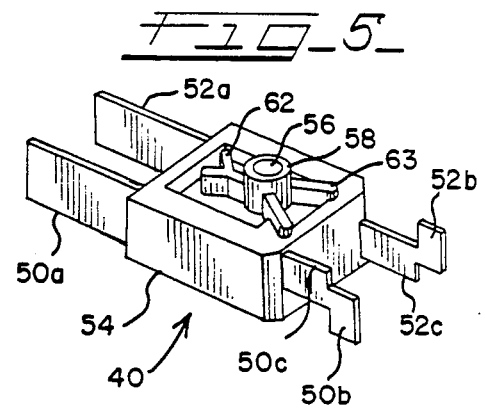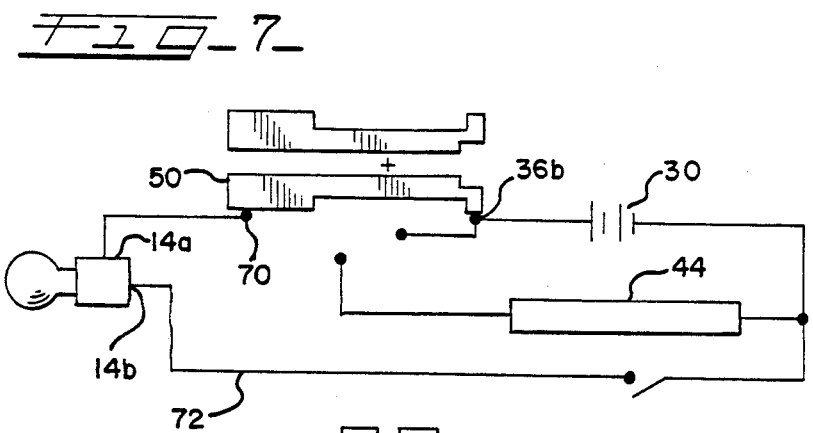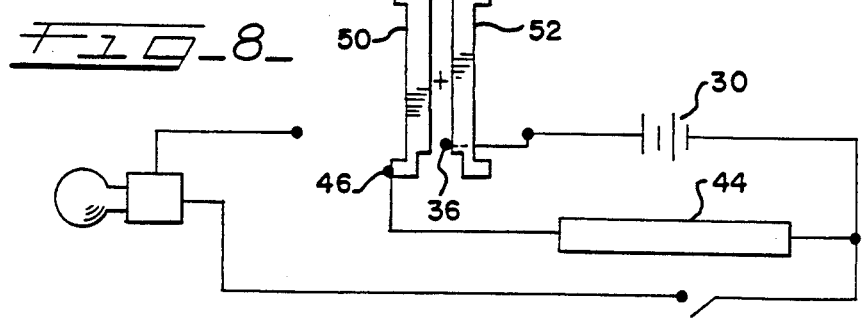

RECHARGEABLE BATTERY-POWERED DEVICE

FIELD OF THE INVENTION

The present invention relates generally to rechargeable battery-powered devices and, more particularly, to self-contained rechargeable battery-powered device adapted to be directly connected to a recharging power source.

BACKGROUND OF THE INVENTION

The use of rechargeable batteries and rechargeable battery-operated devices is well-known. Many rechargeable devices utilize independent recharging modules which can be separate from the device, which is plugged into the recharger module. Other devices utilize an external device, such as a transformer with charging circuitry, plugged into the wall and connected to the deiice to be recharged either through a cable or through some type of an external recharging stand. Other devices using rechargeable batteries are self-contained and include various mechanisms for directly connecting the device to a recharging source, such as a standard a.c. outlet. Two examples of such devices are shown in Bohnstedt, et al. U.S. Pat. No. 3,458,794, issued July 29, 1969, and in Fenne, et al. U.S. Pat. No. 4,647,832, issued Mar. 3, 1987.

In self-contained devices, an appropriate connector, such as a plug having a pair of electrical plug blades or prongs, is adapted to be extended from the device so that the plug blades can be received in an electric outlet or other source of energy. When charging is completed, the prongs are suitably retracted or withdrawn into the device.

For example, the recharging connector or plug blades may be rotatably mounted within the device. The recharging connector may be suitably manipulated so that the blades are rotated to extend out from one surface thereof in position to be inserted into a standard electrical outlet, if that be the nature of the power source, and, alternatively, can be rotated into a position within the housing of the device for storage and operation of the device.

In such self-contained rechargeable devices, when the blades are positioned for connection to a recharging source, i.e., are in the recharging position, the recharging connectors, e.g., the plug blades, normally operate to connect the recharging source to an electric circuit for recharging the batteries. The recharging connector is often disconnected from the recharging circuit when the blades are retracted or positioned into the standby or non-recharging position. In this way, inadvertent connection of the power source to the blades, e.g., when a device or load is connected to the rechargeable batteries, is precluded.

In Fenne, et al U.S. Pat. No. 4,647,832 identified above, and assigned to the assignee of this application, there is disclosed a three-position switch for a portable, rechargeable device, such as a rechargeable flashlight. In the device disclosed in the Fenne, et al. patent, a slide interacts with a rotatable, connector to effect rotation thereof into an extended or charging position. In this position, the connector is connected to a recharging circuit, which is connected to the battery. The slide is also operative to effect repositioning of the recharging connector into a retracted or standby position in which the connector is disconnected from the recharging circuit. Additional operation of the slide effectuates a connection between the batteries and the load, e.g., a light bulb, to energize the load.

The highly successful device embodying the disclosure of the Fenne, et al. patent utilizes a pair of slide contacts connected to the slide for completing the circuit between the rechargeable batteries and the load, or light bulb, for energization thereof when the slide is moved into the "on" position. As shown in the Fenne, et al. patent, two slide contacts are carried by the slide member to complete the circuit between the battery and the light bulb.

While the structure embodied in the Fenne, et al. patent has been highly successful, there is a desire and need to provide for a self-contained, electrically-operated device utilizing rechargeable batteries which can be constructed less expensively with a minimum of components. In conjuntion therewith, it is highly desirable in such electrical devices to ensure that during recharging there is no connection between the battery and the load to prevent inadvertent operation thereof, such as from the source of recharging energy, and also to ensure that when the device is to be operated, the proper connections are made between the battery and the load.

While necessary circuit elements, connectors, and conductors are required, it would be desirable to minimize the number of these components, to construct them of standard materials, to utilize as much as possible electrical connections for multiple purposes without sacrificing and diminishing safety, and to do this all within a self-contained unit providing for reliable operation and rechargeability.

SUMMARY OF THE INVENTION

In accordance with the present invention, there is provided a device operated by rechargeable batteries or similar power sources which is self-contained, which incorporates connecting devices adapted to be retained within the device in a standby, non-recharging position, but adapted to be movable into a recharging position for interaction with a source of recharging power, and in which a minimum number of components are required.

In accordance with the present invention, a recharging connector is utilized not only to connect the battery and charging circuitry to a recharging source, but is alternatively utilized to at least partially effectuate connection of the battery to the load for operating the device or energizing the load. Furthermore, the device incorporating the present invention utilizes a simple mechanical construction, a minimum number of parts, and provides for mounting of the recharging and interconnection contacts to facilitate their multiple utilization.

Thus, a device incorporating the present invention incorporates one or more rechargeable batteries supported therein connected to define a rechargeable energy source. One terminal of the rechargeable source is connected to an electrical contact adapted to be engaged by one of a plurality of recharging connectors positioned for recharging, and adapted to be connected to one of the recharging connectors in the standby position, whereby the circuit can be completed to the load for operation thereof.

A conductor connected to the second terminal of the battery or rechargeable source is adapted to be connected alternatively through a manually-operated switch to the load and to a second recharging contact.

The second recharging contact is engageable by one of the recharging connectors in the recharging position and is open-circuited when the connectors are in the standby position. A manual switch, disposed between the load and the energy source, may be closed to operate the load when the connectors are in the standby position. The circuit between the load and the energy source is completed through one of the recharging connectors in the standby position.

More specifically, in one embodiment of the disclosed invention, the recharging connectors comprise a pair of plug blades, pivotally mounted in the device, and having forward or external connector portions adapted to engage a source of electrical energy. In one embodiment, the external connectors can take the form of a pair of plug blades adapted to be received in the usual a.c. outlet.

When the recharging connectors are in the recharging or external position, the rearward or internal portions of the recharging connectors are adapted to selectively engage the pair of recharging contacts which are connected to either side of the rechargeable batteries. One of the recharging contacts is connected to the batteries through appropriate recharging circuitry.

In the standby position, which includes the off position in which the load is not energized and the on position when the load is energized, one of the recharging connectors is adapted to complete an electrical connection between one terminal of the battery and one terminal of the load by engaging a pair of contacts, one of which is connected to the battery and the other of which is connected to the load to be operated upon actuation of a manual switch. In the standby position, the recharging circuitry connected between the second contact and the battery is open-circuited to prevent damage to the battery and the recharging circuitry.

The recharging connector assembly comprises a pair of elongated conductive members or blades affixed in an insulated housing adapted to be pivotally mounted in the casing of the device. The connector assembly is symmetrical and, therefore, may be mounted in either of two positions to minimize costs and assembly difficulties. In order to minimize space requirements, the connectors make electrical connection with the various contacts, which are varying distances from the axis of rotation of the connector assembly. Portions of the connector blades are offset to effect selective connection to the various contacts at different positions of the connector assembly and to permit rotation of the recharging connector assembly without inadvertent electrical connection therebetween. Many of the contacts utilized in the device incorporating the present invention are configured for installation without complicated assembly steps, to resist deformation, and to maintain the position of the batteries against damage in the event of a variety of rough handling and movement thereof.

Numerous other advantages and features of the present invention will become readily apparent from the following detailed description of the invention and the embodiments thereof, from the claims, and from the accompanying drawings in which the details of the invention are fully and completely disclosed as a part of this specification.

BRIEF DESCRIPTION OF THE DRAWING

FIG. 1 is a perspective view of a rechargeable battery-powered device in the form of a flashlight embodying the present invention;

FIG. 2 is a side elevational view of the flashlight of FIG. 1 showing various components in the recharging position, with one-half of the casing broken away and partially in section;

FIG. 5 is a perspective view of one embodiment of the recharging contacts and connector incorporating part of the present invention;

FIG. 6 is a perspective view of an alternative embodiment of the recharging contacts and connector incorporating part of the present invention;

FIG. 7 is an electric circuit, partially diagrammatic of the device in its recharging position; and FIG. 8 is a circuit of the device in the standby position.

Figure 3:
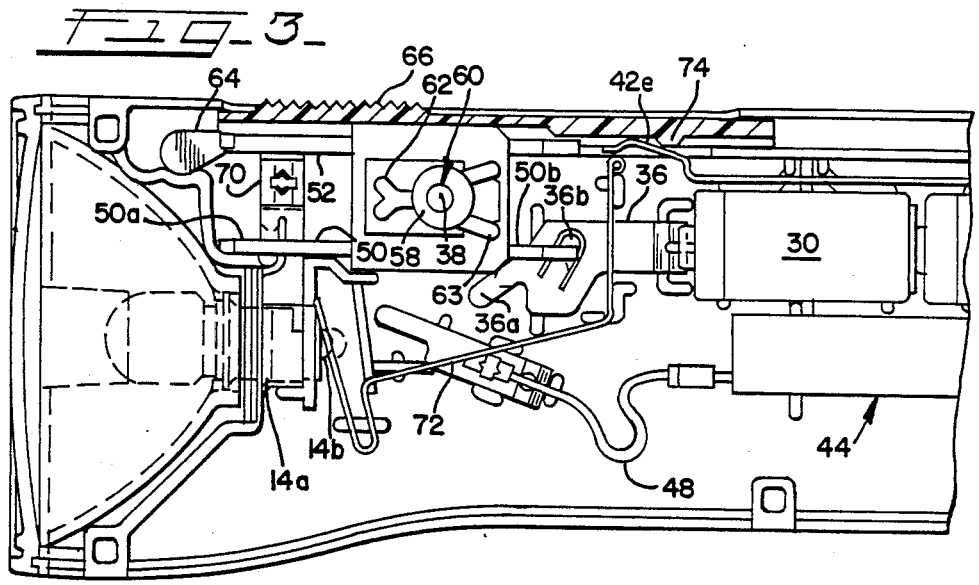
FIG. 3 is a partial elevation similar to FIG. 2 showing the device in the standby or off position.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

In the disclosed embodiment, the rechargeable battery-powered device is shown in the drawing as a rechargeable flashlight 10 in which the components thereof are all disposed within a unitary case or housing 12. The housing 12 may be formed from appropriate materials, such as plastic, and may conveniently be molded therefrom. The housing may conveniently be formed of two substantially identical halves 12a, 12b. The halves are typically unified by suitable techniques, such as ultrasonic welding, when the unit is assembled.

As shown in the drawing, the rechargeable flashlight 10 includes an electrically operated load device, or light bulb 14, inserted into an aperture 16 in the back of a reflector 18, which, together with a surrounding protective lens 19, forms a reflector-lens assembly 20. The assembly 20 and bulb 14 are inserted into the open forward end of the housing 12 to close the housing. The light bulb aperture 16 may include an appropriate key (not shown) adapted to interact with a notch formed in the flange 22 of the base of light bulb 14 to properly position the light bulb therewithin.

The peripheral edges of the reflector 18 may conveniently be provided with suitable locking means to interact with complementary locking means formed on the housing 12 for retaining the reflector lens assembly 20 in position.

The reflector lens assembly includes a first cylindrically shaped inner flange portion 24 adapted to fit within the forward edges of the housing 12 and a second, outer, rearwardly extending lip portion 26 adapted to extend over the outer edge of the housing and to capture a forward edge portion 28 of housing 12 therebetween for appropriately closing the flashlight.

As shown in the drawing, the flashlight 10 is powered by one or more rechargeable batteries 30, referred to hereafter in the singular for convenience, retained within the housing 12 between a pair of battery-retaining members 32, 34 formed integrally with the housing half 12a. The battery is retained within the molded retaining members 32, 34 in the half 12a of the flashlight housing shown and is kept in position by abutment members formed in the other half and engageable with the sides of the battery to retain them in place.

Longitudinal movement of the battery 30 is further limited by a first dual-purpose resilient spring contact 36 which extends over the wall of the forward retaining member 32 and is biased toward the positive contact of the battery 30 for maintaining electrical connection therebetween. The contact 36 extends forwardly of forward retaining member 32.

The forwardly extending portion includes a pair of raised contact elements 36a, 36b disposed at different radial distances from a pivot post 38 for a connector assembly 40.

An elongated switch conductor 42 extends from a forward position adjacent to and offset from the first battery contact 36 rearwardly along the side and spaced from the battery 30, and turns downwardly between the battery 30 and the rear battery retaining member 34 to engage and make electrical connection with the negative terminal of the battery 30.

The rear, downwardly directed portion 42a of the conductor 42 is split to form a first abutment portion 42b and a second resilient portion 42c. The abutment portion 42b maintains the battery 30 in position against displacement in the event of sudden movement of the flashlight 10, e.g., if it is dropped. The second resilient portion 42c normally engages the battery 30 and makes electrical connection therewith. The lowermost extremity 42d of conductor 42 is folded back and around the edge of the rear battery retaining member 34 to retain the conductor 42 in place.

Electrical components of a charging circuit 44 are connected to the second or rear battery contact 42 by a wire 45 forming a part thereof slipped into a wedge-type friction slot formed in the conductor 42. The other terminal or side of the charging circuit 44, which may consist conveniently of a diode 44a and resistor 44b, or other suitable components for the particular type of batteries being recharged, is connected to a second, charging contact 46. The charging contact 46 includes a raised portion 46a having a slot formed therein for receiving and frictionally grasping a wire 48 connected to the charging circuit 44. The forward portion 46b of the third, charging contact 46 is displaced upwardly from the plane thereof for engagement with a rear portion of blade 50 of the charging connector assembly 40 as described below.

Figure 4:
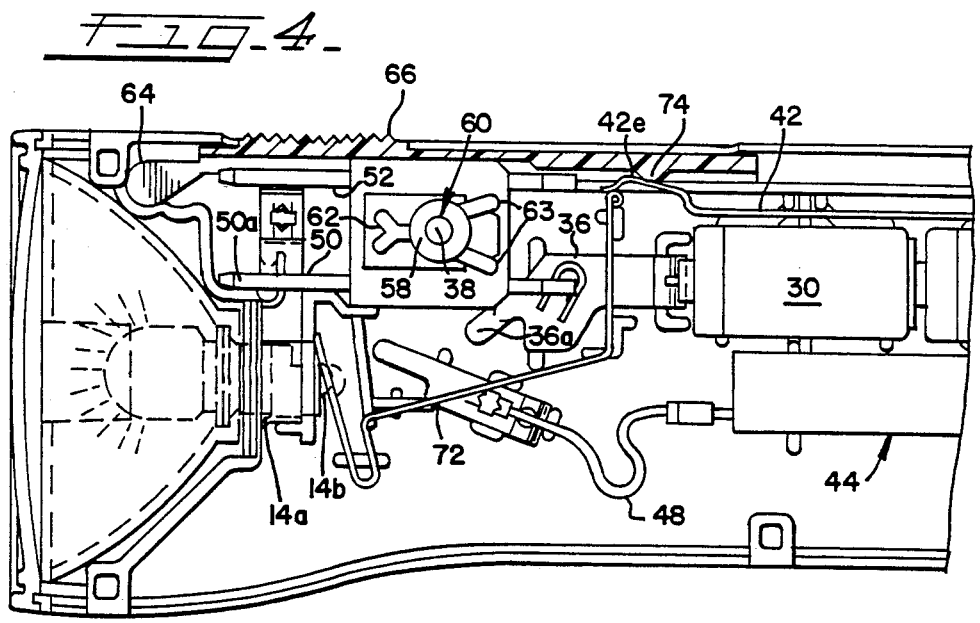
FIG. 4 is a side view similar to FIG. 3 showing the device in the on position in which the load would be energized.

The battery is recharged by utilizing the recharging connector assembly 40 which, in the embodiment shown in the drawing (see FIG. 5), includes two blades 50, 52 adapted to be received in the usual a.c. outlet. The forward ends 50a, 52a of the blades 50, 52 are a standard configuration for insertion into an a.c. outlet. The back or internal portions 50b, 52b of the connector blades 50, 52 are reduced in depth. Blade portion 50b has an intermediate portion 50c adjacent one side of the body 54 of the connector assembly 40, and the other blade portion 52b has its intermediate portion 52c adjacent the other side of the connector body 54. The inner ends of the internal blade portions 50b, 52b are offset transversely to the axis of the blades in opposite directions. The blades 50, 52 are mounted in the insulated body 54 having an aperture 56 passing through a central portion thereof. A flanged general cylindrical wall 58 extends up from the opposite sides of the body 54 to define a pivot 60 for the body 54, which is received on the pivot pin 38. A pair of cam surfaces 62, 63 extend forwardly and rearwardly of the pivot 60 on both sides of body 54 and are engageable with projecting cam actuators 64 of an actuator slide member 66 to effectuate rotation of the connector blade assembly 40 between a standby or load connecting position, as shown in FIGS. 3 and 4, and an elevated position of about 15° to facilitate grasping and manual rotation thereof into the charging position shown in FIG. 2. The connector assembly 40 is generally symmetrical about its longitudinal axis so either side can be installed on pivot post 38 in the flashlight housing 12. The diameter of the pivot aperture 56 on the connector body 54 is less than a surrounding pivot retaining wall portion formed in the body 12. The pivot wall 58 is received in the annular opening between the post 38 and the surrounding wall for providing an accurate positioning of the connector, as well as adding additional strength and rigidity to the pivot connection between the connector assembly 40 and the housing 12.

As shown in the drawing, the charging contacts 36a, 36b are disposed at different radial distances from the pivot post 38. As a result, the intermediate portion of blade 50 passes over the first recharging contact position 36a as the assembly 40 rotates into its upright, charging position, and engages the second connector 46b spaced away from the pivot pin by a distance equal to the distance that the downwardly offset end is spaced from the pivot pin 38 when the connector assembly is mounted on pin 38. Simultaneously, the intermediate portion 52c of the inner portion 52b of second or single purpose connector blade 52 makes contact with the upwardly tapered finger 36a of the first contact 36 when the connector assembly 40 is in its extended or recharging position.

This completes a circuit between the two connector blades 50, 52 to the battery 30 through the charging circuit 44. The single purpose connector blade 52 is connected directly to the positive terminal of the battery 30 through the first charging contact 36. The second, dual-purpose connector blade 50 is connected to the negative terminal of the battery 30 through the recharging circuit 44, which is connected between the negative terminal of the battery 30, and the second, recharging contact 46. The bent tip 46b of contact 46 engages the downwardly offset inner end of the dual-purpose connector 50 when positioned as shown in FIG. 2.

When the connector assembly 40 is rotated into its retracted or standby position, as shown in FIGS. 3 and 4, the inner rear portion 50b of the dual-purpose blade connector 50 engages a second upwardly displaced offset portion 36b of the first recharging dual-purpose contact 36, thereby connecting the dual-purpose connector blade 50 to the positive terminal of the battery 30. The forward end 50a of the dual-purpose connector blade 50 engages a first bulb contact 70 which, as shown in the drawing, is disposed transverse to the axis of the flashlight 10. The bulb contact 70 has a bulb contacting portion 70a adapted to engage, surround, and engage the body 14a of the light bulb 14, and be engaged by the forward portion 50a of the dual-purpose blade 50. The second, single-purpose blade 52 makes no electrical connection when in the standby or load-connecting position.

A second, electrical connection to the center contact 14b of light bulb 14 is provided by a generally L-shaped conductor 72 which traverses, but is spaced away from, the first, dual-purpose contact 36 and the second contact 46. A first end portion 72a extends around a pin immediately adjacent the upper extremities of the housing 12 and adjacent to, but spaced from the forward, flexible end 42e of conductor 42. The intermediate portion of conductor 72 is bent at an angle and is supported by several posts formed in the housing 12. The forward end 72b of conductor 72 is spring-biased and generally U-shaped, and is disposed substantially transverse to the axis of the intermediate portion. The free end of the U-shaped forward end 72a extends towards the rear central contact 14b of the light bulb 14, and is engaged thereby when the bulb 14 is in place.

Thus, when the charging connector assembly 40 is rotated into its standby or load-connecting position, a circuit is completed between the positive terminal of the battery 30 and the contact 70 for the light bulb 14 through the dual-purpose connector blade 50 engaging the first dual-purpose contact 36 and raised contact portion of the first light bulb contact 70. The negative terminal of the battery 30 is connected to the center post 14b of the light bulb 14 through the generally L-shaped conductor 72, and the conductor 42 when the forward free end of conductor 42 is moved into contact with the upper end of the conductor 72.

When the slide actuator 66 is moved forwardly, the projections 64 engage the cams 62 of the connector body 54 to rotate it into its load-connecting position. As the slide actuator 66 is moved forward into the on position, a protrusion 74 on the under surface thereof engages and deflects the free end of conductor 42, causing it to engage the free end of the L-shaped conductor 72 to complete the circuit between the battery 30 and the electric load, i.e., light bulb 14.

The forward end of the slide actuator 66 is formed with the curvilinear, downwardly extending projections 64, which are engageable successively in a pair of detents 78, 80 formed in the housing 12. The detent 78 retains the slide 66 in its off position, but allows the slide to be moved forwardly into the on position. The detent 80 interacts with the projections 64 to retain the slide 66 in the on position.

FIG. 6 shows an alternative embodiment of a connector assembly 140, which is the same as assembly 40 except for a modification of cam 163. The rear portion of cam 163 is curved toward the side edge. Thus, when the projections 64 on slide 66 engage the cam 163 as the slide 66 is moved rearwardly to its recharge position shown in FIG. 2, the assembly 140 is rotated substantially all the way into the recharging position.

It should be appreciated that the shape of the connector assembly 40 can be adapted and be suitable for connection to a variety of load-charging devices. For example, the forward or free ends of the connector might be in the form of generally cylindrical contacts and be adapted to be received or be inserted into a typical cigarette lighter socket. Other configurations for interacting with appropriate sources of recharging energy can be utilized in conjunction with the rechargeable electric load device of the present invention.

Furthermore, although a very simple recharging circuit is shown in the drawing which can be used in conjunction with typical NI-CAD rechargeable batteries, different charging circuitry as appropriate can be substituted in conjunction with other rechargeable systems, such as rechargeable lead acid type batteries, which are also usable in similar configurations.

Thus, there has been disclosed a rechargeable batter-powered device, such as a rechargeable flashlight, which is self-contained and includes all components thereof within a unitary housing in which batteries are connected to a source of recharging power, such as the usual a.c. outlet, utilizing pivotable dual-purpose recharging connectors operable to connect the battery to the recharging circuit, and operable in its retracted or load-connecting position to connect one side of the electrical source of the rechargeable power source to the load, which, in turn, is connected to the other side of the power source through a manually-operable switch means, selectively actuatable for energizing the load from the battery source. In operation, the connectors disconnect the load and the battery from the recharging source when in the load-connecting position, and disconnect both sides of the load from the batteries when in the recharging position.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A rechargeable device comprising:
   a battery-operated load;
   a rechargeable battery means adapted to provide power to said load;
   connector means selectively positionable in a first recharging position for effecting connection of said battery means to a source of recharging energy and in a second standby position for providing a connection circuit between said battery means and said load;
   said connector means including first and second conductive connector members for effecting a connection between said battery means and said energy source when said connector means is in said recharging position;
   one of said connector members being operable to provide a connection between said battery means and said load when said connector means is in said standby position; and
   switch means operable to complete a circuit between said battery means and said load for energizing said load when said connector means is in said standby position.

2. A device as claimed in claim 1, wherein:
   said load is connectable to said battery means through said switch means and said one conductive connector member when said connector means is in said standby position, and said load means is disconnected from said battery means when said connector means is in said recharging position.

3. A device as claimed in claim 1, including:
   first contact means, said first contact means being connected to one terminal of said battery means and being engageable by said second connector member when said connector means is in said recharging position for effecting connection between said connector member and said one terminal of said battery means.

4. A device as claimed in claim 3;
   wherein said first contact means includes a first contact portion engageable with said second conductor member for effecting electrical connection thereto when said connector means is in said recharging position;

said first contact including a second contact portion engageable with said first connector member for connecting said first connector member to said one terminal of the battery means when said connector means is in said standby position.

5. A device as claimed in claim 4, including;
second contact means connected to a second terminal of said battery means and engageable by said first connector member when said connector means is in said recharging position for completing a circuit from said first connector member to said second terminal of said battery means for effecting connection of the battery means to a source of recharging energy.

6. A device as claimed in claim 5, including;
recharging circuit means connected between said second contact means and said second terminal of said battery means.

7. A device as claimed in claim 6, including;
third contact means connected to said second terminal of said battery means, and wherein said recharging circuit is connected between said second and third contact means.

8. A device as claimed in claim 7, including;
fourth contact means connected to a second terminal of said load means and defining with said third contact means manually-operated switch means.

9. A device as claimed in claim 1, including;
manually-operated actuator means engageable with said connector means for effecting movement thereof to enable positioning thereof in said standby and recharging positions.

10. A device as claimed in claim 9, wherein;
said connector means includes a non-conductive body means;
cam means formed on said body means;
and wherein said actuator means includes means engageable with said cam means for effecting said movement of said connector means to enable positioning thereof in said recharging and standby positions.

11. A device as claimed in claim 10, wherein;
said actuator means is movable between a first recharging position and a second standby position, said means on said actuator means engageable with said cam means for effecting movement of said connector means towards said recharging position in response to movement of said actuator means into said recharging position.

12. A device as claimed in claim 11, wherein;
said means on said actuator means is engageable with said cam means for effecting movement of said connector means from said recharging position to said standby position in response to movement of said actuator means from said charging position to said standby position.

13. A device as claimed in claim 12, wherein;
said device includes detent means engageable with said cam engaging means on said actuator means for retaining said actuator in said standby position.

14. A device as claimed in claim 13, wherein;
said actuator means has a third on position, means on said actuator means engageable with said switch means in response to movement of said actuator means into said on position for closing said switch means and completing the circuit between said battery means and said load means.

15. A device as claimed in claim 14, including;
additional detent means cooperating with said cam engaging means on said actuator means for retaining said actuator means in said on position.

16. A device as claimed in claim 1, wherein;
said connector means is pivotally mounted for movement between said recharging position where the connector members project out from one surface of said device for connection to a source of recharging energy, and said second standby position wherein said connector members are retained within said housing.

17. A device as claimed in claim 16, wherein;
said conductors are disposed generally parallel to the axis of said device when in said standby position.

18. A device as claimed in claim 17, wherein;
one of said connector members is disposed adjacent the surface of said device when in said standby position, said one connector member being disconnected from all electrical circuitry in said standby position.

19. A device as claimed in claim 18, including;
a manually-operable actuator means movable between a recharging position and a standby position, said actuator means including engaging means cooperative with said connector means for effecting movement thereof from said standby position towards said recharging position in response to movement of said actuator means into said recharging position, and engageable with said connector means for effecting movement thereof from said recharging position into said standby position in response to movement of said actuator means into said standby position.

20. A device as claimed in claim 19, wherein;
said actuator means is a slidable member movable longitudinally of the housing of said device, sadd slidable member covering said connector means in said standby position.

* * * * *